(12) United States Patent
Harris et al.

(10) Patent No.: US 11,607,940 B2
(45) Date of Patent: Mar. 21, 2023

(54) GLASS STABILIZATION FOR VERTICAL DROPPING GLASS IN VEHICLES

(71) Applicant: TOYOTA MOTOR ENGINEERING & MANUFACTURING NORTH AMERICA, INC., Plano, TX (US)

(72) Inventors: Ryan C. Harris, Saline, MI (US); Scott L. Frederick, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 311 days.

(21) Appl. No.: 16/842,616

(22) Filed: Apr. 7, 2020

(65) Prior Publication Data

US 2021/0309087 A1    Oct. 7, 2021

(51) Int. Cl.
*B60J 10/50* (2016.01)
*B60J 1/18* (2006.01)

(52) U.S. Cl.
CPC ............ *B60J 10/50* (2016.02); *B60J 1/1838* (2013.01)

(58) Field of Classification Search
None
See application file for complete search history.

(56) References Cited

U.S. PATENT DOCUMENTS

| | | |
|---|---|---|
| 3,837,700 A | 9/1974 | Van Slyke |
| 4,119,341 A | 10/1978 | Cook |
| 8,555,552 B2 | 10/2013 | Hooton |
| 10,682,903 B1 * | 6/2020 | Gandhi et al. ........... B60J 10/84 |
| 2019/0168592 A1 | 6/2019 | Baskar |

FOREIGN PATENT DOCUMENTS

| | | | |
|---|---|---|---|
| DE | 4119704 A1 * | 12/1992 | ............ B60J 10/244 |
| DE | 102015007447 A1 * | 12/2016 | ............. B60J 10/75 |
| GB | 2273733 | 6/1994 | |

OTHER PUBLICATIONS

Ball Wilfried, Machine Translation of DE 4119704, "Hollow Seal for Movable Window of Car—Has Inflation of Seals Used to Form Tight Fit With Glass", IP.com, Dec. 17, 1992 (Year: 1992).*
Seal Master Brochure "Engineered Inflatable Seals" Seal Master Corporation.

* cited by examiner

*Primary Examiner* — Jason S Morrow
*Assistant Examiner* — Wenwei Zhuo
(74) *Attorney, Agent, or Firm* — Sheppard, Mullin, Richter & Hampton LLP; Hector A. Agdeppa; Daniel N. Yannuzzi

(57) ABSTRACT

A window stabilization system for a window of a vehicle includes a first inflatable bladder positioned adjacent a path along which the window passes such that the inflatable bladder will engage a surface of the window when the window is opened at least a predetermined amount and the inflatable bladder is inflated; an inflator in fluid communication with the first inflatable bladder configured to pump a fluid into the inflatable bladder such that when the first inflatable bladder is inflated a predetermined amount, the first inflatable bladder comes into physical contact with a surface of the window when the window is opened at least a predetermined amount; and a bladder control system to control operation of the inflator in response to data received regarding operation of the window.

7 Claims, 5 Drawing Sheets

GLASS STABILIZATION FOR VERTICAL DROPPING GLASS IN VEHICLES

TECHNICAL FIELD

The present disclosure relates generally to vehicle systems, and in particular, some implementations may relate to systems and methods for back-glass stabilization in pickup trucks.

DESCRIPTION OF RELATED ART

For some vehicles, including pickup trucks with vertical dropping back glass, when a window is in a partial down or fully down position, the glass may rattle because it is not supported by the window frame.

BRIEF SUMMARY OF THE DISCLOSURE

According to various embodiments of the disclosed technology, a window stabilization system for a window of a vehicle, may include a first inflatable bladder positioned adjacent a path along which the window passes such that the inflatable bladder will engage a surface of the window when the window is opened at least a predetermined amount and the inflatable bladder is inflated. The inflator is provided in fluid communication with the first inflatable bladder and is configured to pump a fluid such as air into the inflatable bladder such that when the first inflatable bladder is inflated a predetermined amount, the first inflatable bladder comes into physical contact with a surface of the window when the window is opened at least a predetermined amount. The bladder control system controls operation of the inflator in response to data received regarding operation of the window, such as from the window switch.

Some embodiments may also include a second inflatable bladder positioned opposite the first inflatable bladder adjacent a path along which the window passes such that the second inflatable bladder will engage an opposite surface of the window when the window is opened at least a predetermined amount in the second inflatable bladder is inflated.

Some embodiments may also include a sensor to detect an amount by which the window is open.

In various embodiments, a window stabilization system for a window of a vehicle, comprising: a processor; and a memory coupled to the processor to store instructions, which when executed by the processor, cause the processor to perform operations, the operations comprising: determining whether the window is open; and when the window is open, actuating an inflator to inflate a bladder mechanism comprising a bladder adjacent the open window such that the bladder comes into physical contact with the window. Determining whether the window is open comprises determining whether the window is open a predetermined amount. The bladder mechanism may include two bladders adjacent and on opposite sides of the open window such that each bladder comes into physical contact with the window upon inflation.

The operations may further comprise sensing actuation of a window switch operating the window and deflating the bladder mechanism to allow the window to be raised or lowered.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide stabilization for vehicle glass, such as windows or other glass that are not secured by a track or frame. For example, embodiments can provide stabilization for partially opened vehicle windows. Such embodiments may include an inflatable bladder or bladders that can be inflated to stabilize a window when in a partially open position and can be deflated to allow the window to be raised and lowered without interference. A controller can be provided to control inflation and deflation of the bladder mechanism.

Figure 1:
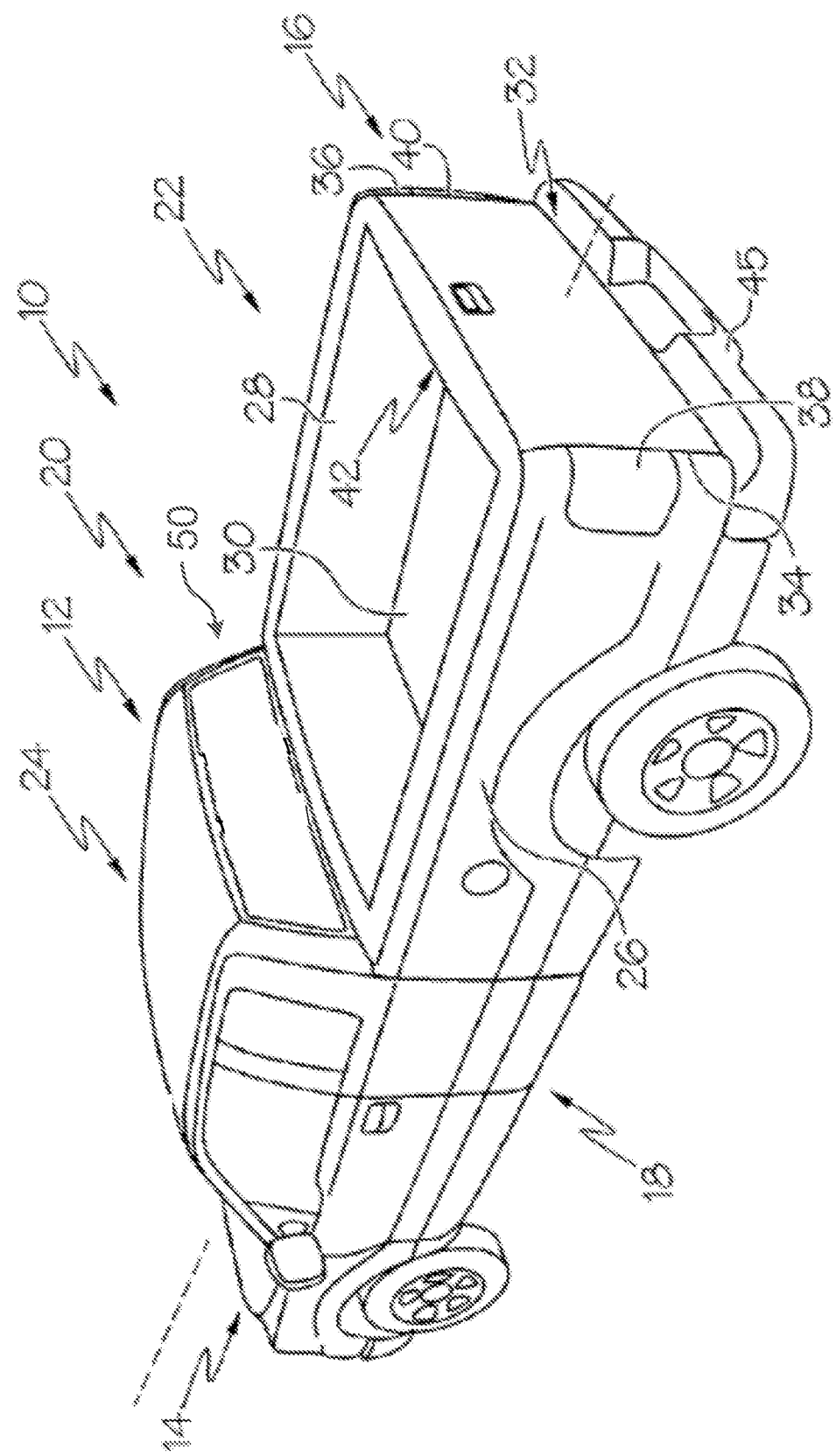
FIG. 1 is a perspective view of an example vehicle with which back-glass stabilization can be used in accordance with one or more embodiments of the systems and methods shown and described herein.

Although embodiments may be implemented in any of a number of different vehicles, one example vehicles may include a pickup truck, crossover or SUV including a back glass it is capable of being raised and lowered. FIG. 1 is a perspective view of an example vehicle with which back-glass stabilization can be used according to one or more embodiments shown and described herein. Referring now to FIG. 1, the vehicle 10 includes a vehicle body 12 having a front 14, a rear 16 and sides 18, 20 extending between the front 14 and the rear 16 in the vehicle longitudinal direction. In the illustrated embodiment, the vehicle 10 is a pickup truck including a cargo area 22 that is formed rearward of a cabin area 24 by sidewalls 26, 28, floor 30 and a tailgate assembly 32 located between tailgate posts 34 and 36. The tailgate posts 34 and 36 may include taillights 38 and 40 and latch components (e.g., strikers) that can releasably connect to the tailgate assembly 32 for releasably latching the tailgate assembly 32 in a raised configuration, as shown. Vehicle 10 also includes a rear bumper 45.

In this example, vehicle 10 includes a back glass 50 that can be raised and lowered. In this example, back glass 50 includes a single pane. In other examples, back glass 50 may include a different quantity of panes. In some vehicles, back glass 50 may be dimensioned such that the upper portion of the glass is of a shorter width than the lower portion of the glass. In such applications, when lowered, back glass 50 may no longer be secured within the window frame. This can result in vibrations of back glass 50. The embodiments disclosed herein may be used to stabilize back glass 50 and other windows to reduce vibrations.

Figure 2:
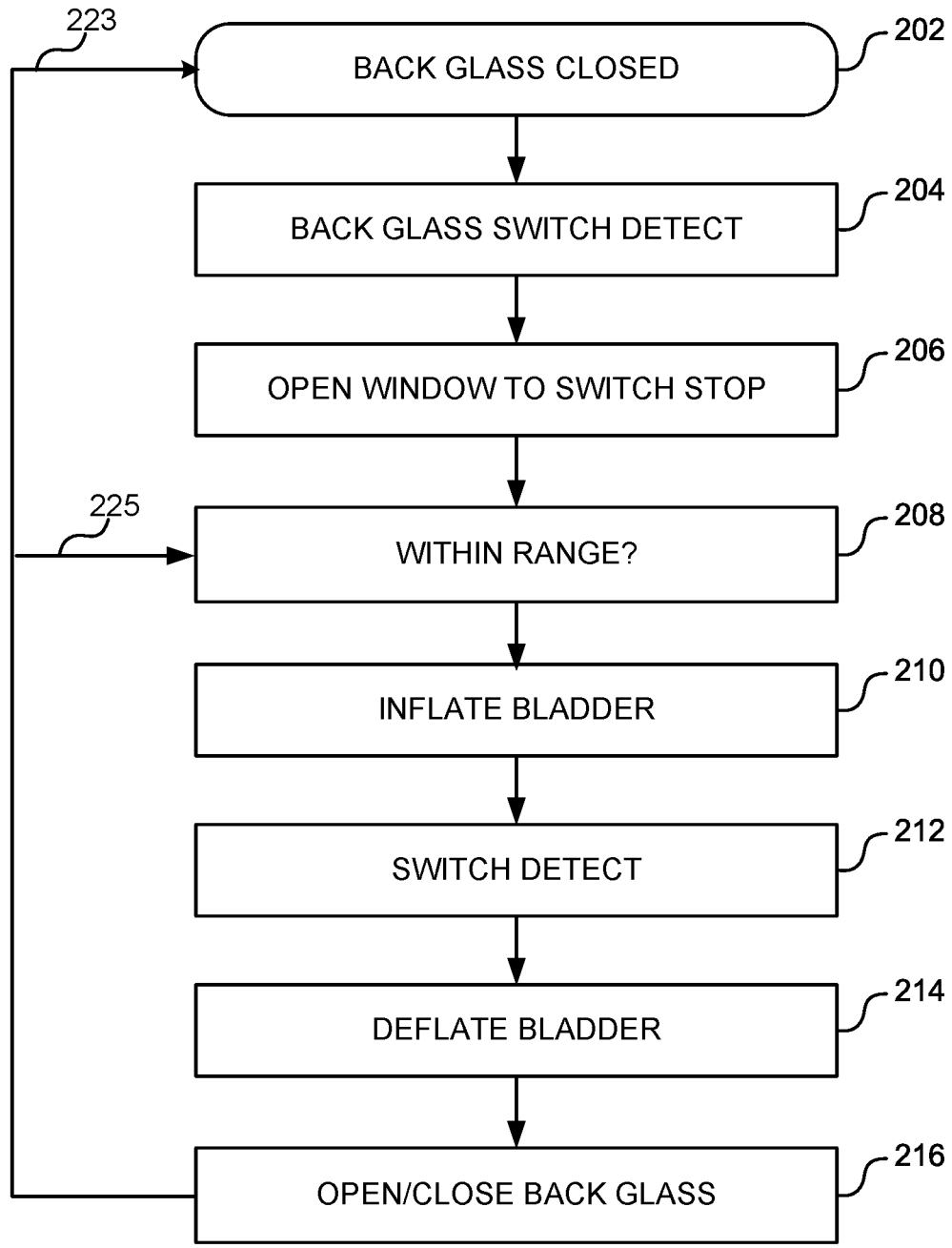
FIG. 2 illustrates an example process for stabilizing a window in accordance with one or more embodiments of the systems and methods shown and described herein.

FIG. 2 illustrates an example process for stabilizing a window in accordance with one or more embodiments of the systems and methods shown and described herein. This example is described in terms of a back glass window such as, for example, back glass 50. However, after reading this description one of ordinary skill will appreciate how this process can be implemented with other windows. Referring now to FIG. 2, at a starting point 202, the back glass is closed.

At operation 204, a back glass window system detects actuation of a switch that operates (e.g., raises and lowers) the back glass. In response to switch actuation, the back glass window system operates the back glass motor to open the window until the switch is released. The stabilization system also detects that the window switch is activated and detects that the window is opened. In some embodiments, the stabilization system may determine whether the window is opened partially or fully, or to what extent the window is opened. In in the illustrated example, at operation 208 the stabilization system determines whether the window is opened to within a range within which the window would be subject to rattling or vibration.

At operation 210, the stabilization system inflates a bladder mechanism that may include one or more inflatable bladders to stabilize the window. In examples where the stabilization system determines whether the window is opened to within a particular range, the stabilization system only inflates the bladder mechanism when the window is open to within this range. In other applications, the stabilization system may be configured to inflate the bladder mechanism any time the window is opened. In this example, the stabilization system inflates the bladder mechanism after the window stops moving.

At operation 212, the stabilization system detects actuation of the window switch. Because the window is now open, actuation of the switch can cause the window to open or close depending on how the switch is actuated (e.g., pressed up or down or pressed forward or backward by the operator). Upon detection of the actuation, at operation 214 the stabilization system deflates the bladder by a sufficient amount to allow the window to be raised or lowered in accordance with the switch actuation. At operation 216, the back glass window system, which also received the actuation signal, operates the back glass motor to raise or lower the window. The amount by which the stabilization system deflates the bladder may vary depending on the implementation, but the bladder mechanism is generally deflated sufficiently to allow the window to be raised or lowered without undue interference (e.g., friction) from the bladder or bladders of the bladder mechanism. In some cases, this can include deflating the bladder or bladders substantially completely, while in other cases this can include deflating the bladder or bladders by a sufficient amount such that they are no longer in physical contact with the window (aside from occasional contact that may occur due to rattling of the window), while in still other cases this can include deflating the bladder or bladders by a sufficient amount such that the distance between the contact surfaces of the bladder (i.e., the services that contact the window when inflated) is greater than a thickness of the glass (e.g., greater by 10%, 15%, 20%, 25%, 30%, 35%, 40%, 45%, 50%, 55%, 60%, 65%, 70%, 75%, 80%, 85%, 90%, 95%, 100%, or some other amount greater than the thickness of the glass).

In some embodiments, when the back glass is fully closed (flowline 223) stabilization is not required because the window is seated within its frame and the stabilization system need not reinflate the bladders. In other embodiments, the stabilization system can be configured to reinflate the bladders even when the window is returned to the fully closed position. In such cases, before the window is opened from the fully closed position, the bladder stabilization system can be configured to deflate the bladder mechanism.

As illustrated by flowline 225, if by operation 216 the window is moved to a different open position, the process may resume at operation 208 where the system determines whether stabilization is required in the bladder mechanism should be inflated.

In some embodiments, the system can be configured such that it always engages the bladder mechanism when the window is stopped regardless of the position of the window. In other words, the system can be configured to not check whether the window is closed or to not check the amount by which the window is opened. In such implementations the system simply engages the bladder mechanism when the window is stopped and disengages the bladder mechanism so that the window can be raised or lowered.

Figure 3:
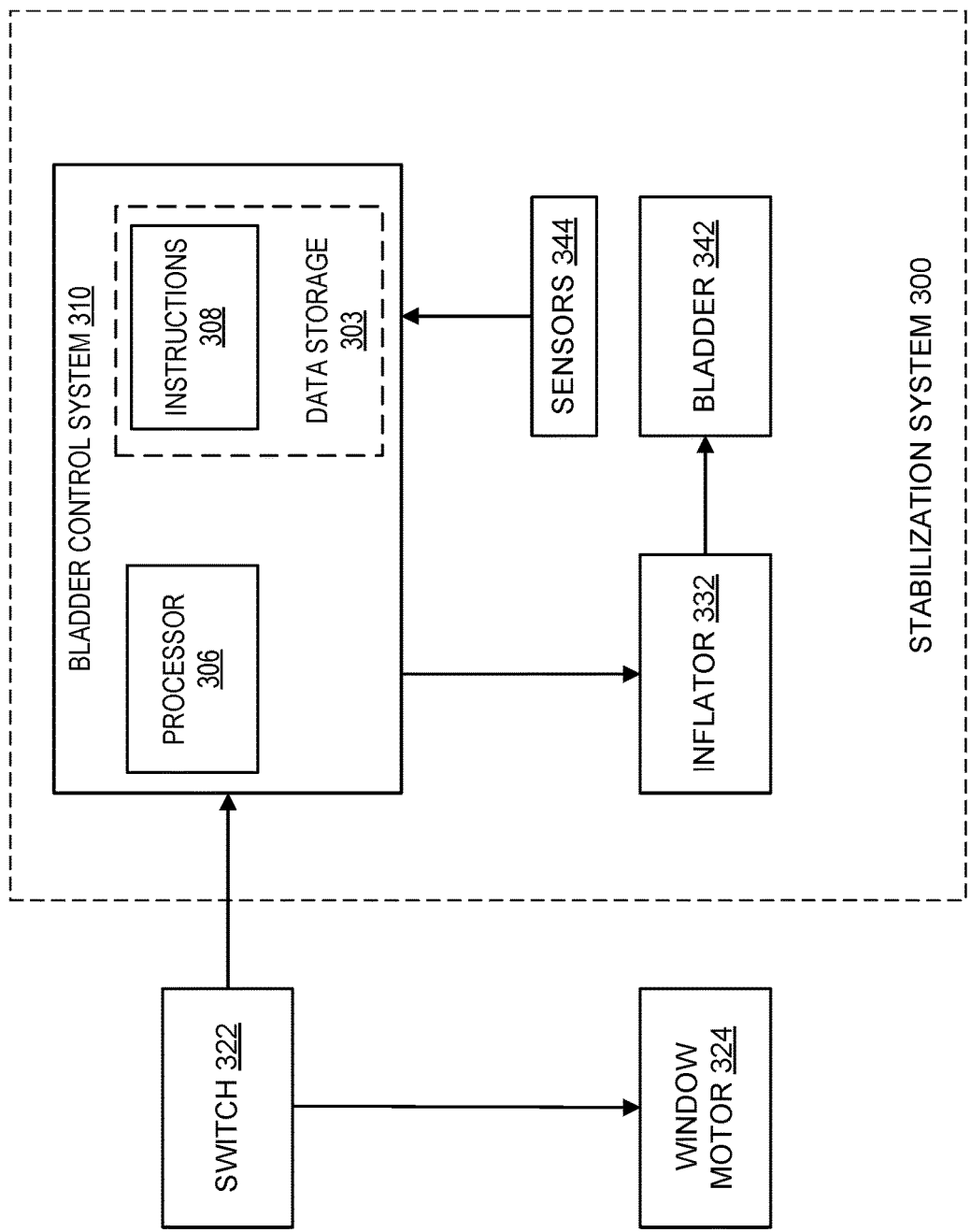
FIG. 3 illustrates an example system for stabilization control in accordance with one or more embodiments of the systems and methods shown and described herein.

FIG. 3 illustrates an example system for stabilization control in accordance with one or more embodiments of the systems and methods shown and described herein. Referring now to FIG. 3, window stabilization system 300 (add dashed box to figure) includes a bladder control system 310, and inflator 332, a bladder mechanism 342 and a sensor 344. Stabilization system 300 is illustrated as receiving input from window switch 322, which also controls window motor 324.

Bladder control system 310 in this example includes a processor 306 and data storage 303. Some or all of the functions of stabilization system 300 may be controlled by bladder control system 310. Processor 306 can include one or more GPUs, CPUs, microprocessors or any other suitable processing system. Processor 306 may include one or more single core or multicore processors. Processor 306 executes instructions 308 stored in a non-transitory computer readable medium, such as memory 303.

Memory 303 may contain instructions (e.g., program logic) executable by processor 306 to execute various functions of the stabilization system. Memory 303 may contain additional instructions as well, including instructions to transmit data to, receive data from, interact with, and/or control one or more sensors and other vehicle systems. In addition to the instructions, memory 303 may store data and other information used by the system for stabilization control.

Although one bladder control system 310 is illustrated in FIG. 3, in various embodiments multiple bladder control systems 310 can be included. Additionally, one or more other systems and subsystems of stabilization system 300 can include its own dedicated or may share computing system 310, or a variant thereof. Accordingly, although bladder control system 310 is illustrated as a discrete computing system, this is for ease of illustration only, and bladder control system 310 in various forms can be distributed among various vehicle systems or components.

Sensors 344 can include one or more sensors such as a window position sensor to determine a position of the window such as, for example, fully open, fully closed, open 5% (or open x centimeters), open 10%, etc. Inflator 332, which can be triggered by bladder control system 310 can be engaged to inflate bladder mechanism 342 or to deflate bladder mechanism 342. Bladder mechanism 342 can include one or more bladders positioned, for example, on opposite sides of the window glass. Inflator 332 can include a pump (e.g., an inflation pump) or other mechanism to pump air or another suitable fluid into the one or more bladders of bladder mechanism 342. Inflator 332 can also include a relief valve to release pressure from the one or more bladders of bladder mechanism 342.

Window switch 322 may include a button or other actuator to allow an operator to open or close the back glass or other window with which the stabilization system is used. As illustrated in this example, actuation of window switch 322 can provide a signal to window motor 324 to open or close the affected window. Additionally, actuation of window switch 322 can provide a signal to bladder control system 310 to signal to bladder control system 310 that the window is being opened or closed. Accordingly, bladder control system 310 can use this signal to determine whether to de-inflate bladder mechanism 342 so that the window can be operated (e.g., opened or closed). Bladder control system 310 may also use this signal to determine or data from sensors 344, or both whether to inflate bladder mechanism 342

In various embodiments, the stabilization system may be implemented to control stabilization for multiple windows. In such cases, there may be multiple bladder mechanisms 342 (e.g., one or more bladders for each window) with individual or shared inflators 332.

Figure 4:
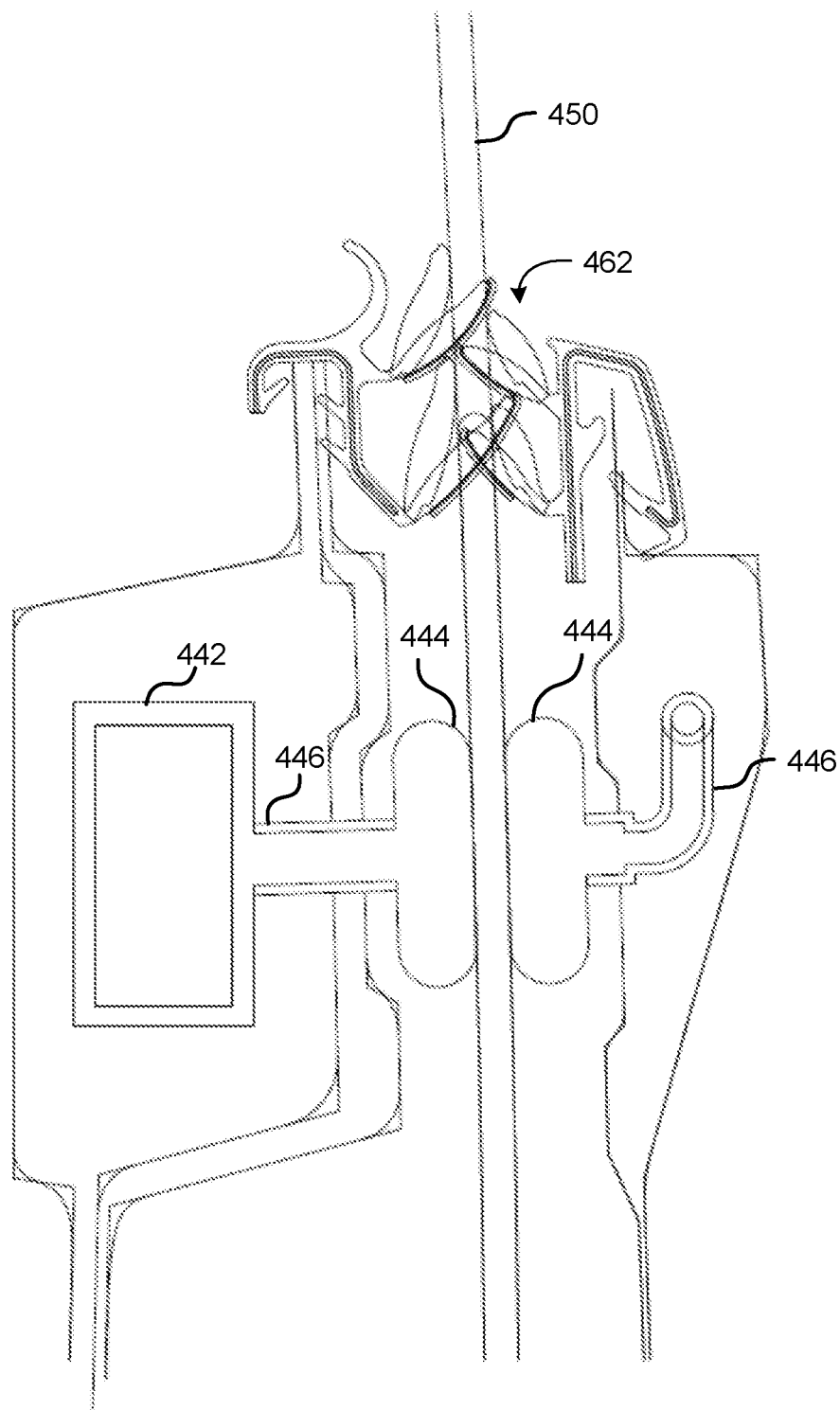
FIG. 4 illustrates an example system for stabilization control in accordance with one or more embodiments of the systems and methods shown and described herein.

FIG. 4 illustrates an example system for stabilization control in accordance with one or more embodiments of the systems and methods shown and described herein. Referring now to FIG. 4, this example includes an inflator unit 442 in fluid communication with two bladders 444 via a tube 446. As seen in this example, bladders 444 can be inflated to engage opposite sides of glass panel 450. As described above with reference to FIG. 3, signals from a control circuit (e.g., bladder control system 310) can actuate inflator unit 442 to inflate or deflate air bladders 444. This example includes inner and outer belt molding, or weatherstrips 462.

As seen in FIGS. 3 and 4, a window stabilization system for a window of a vehicle, may include a first inflatable bladder positioned adjacent a path along which the window passes such that the inflatable bladder will engage a surface of the window when the window is opened at least a predetermined amount and the inflatable bladder is inflated. The inflator is provided in fluid communication with the first inflatable bladder and is configured to pump a fluid such as air into the inflatable bladder such that when the first inflatable bladder is inflated a predetermined amount, the first inflatable bladder comes into physical contact with a surface of the window when the window is opened at least a predetermined amount. The bladder control system controls operation of the inflator in response to data received regarding operation of the window, such as from the window switch. The example embodiments also include a second inflatable bladder positioned opposite the first inflatable bladder adjacent a path along which the window passes such that the second inflatable bladder will engage an opposite surface of the window when the window is opened at least a predetermined amount in the second inflatable bladder is inflated.

Although the embodiments described above include one or more air bladders to stabilize the window, other instrumentalities can be used to provide stabilization. For example, plunger mechanisms controlled, for example, by solenoids, motors or other actuating mechanisms, can be used in place of or in addition to air bladders to stabilize the window. For example, when not in motion, the plungers can be extended to come into contact with either or both sides of the glass panel. The plungers can include soft tips to avoid damaging the glass panel. Also, the plungers can be connected to their actuating mechanism by a spring or elastomeric material to provide more gentle contact with the glass.

Figure 5:
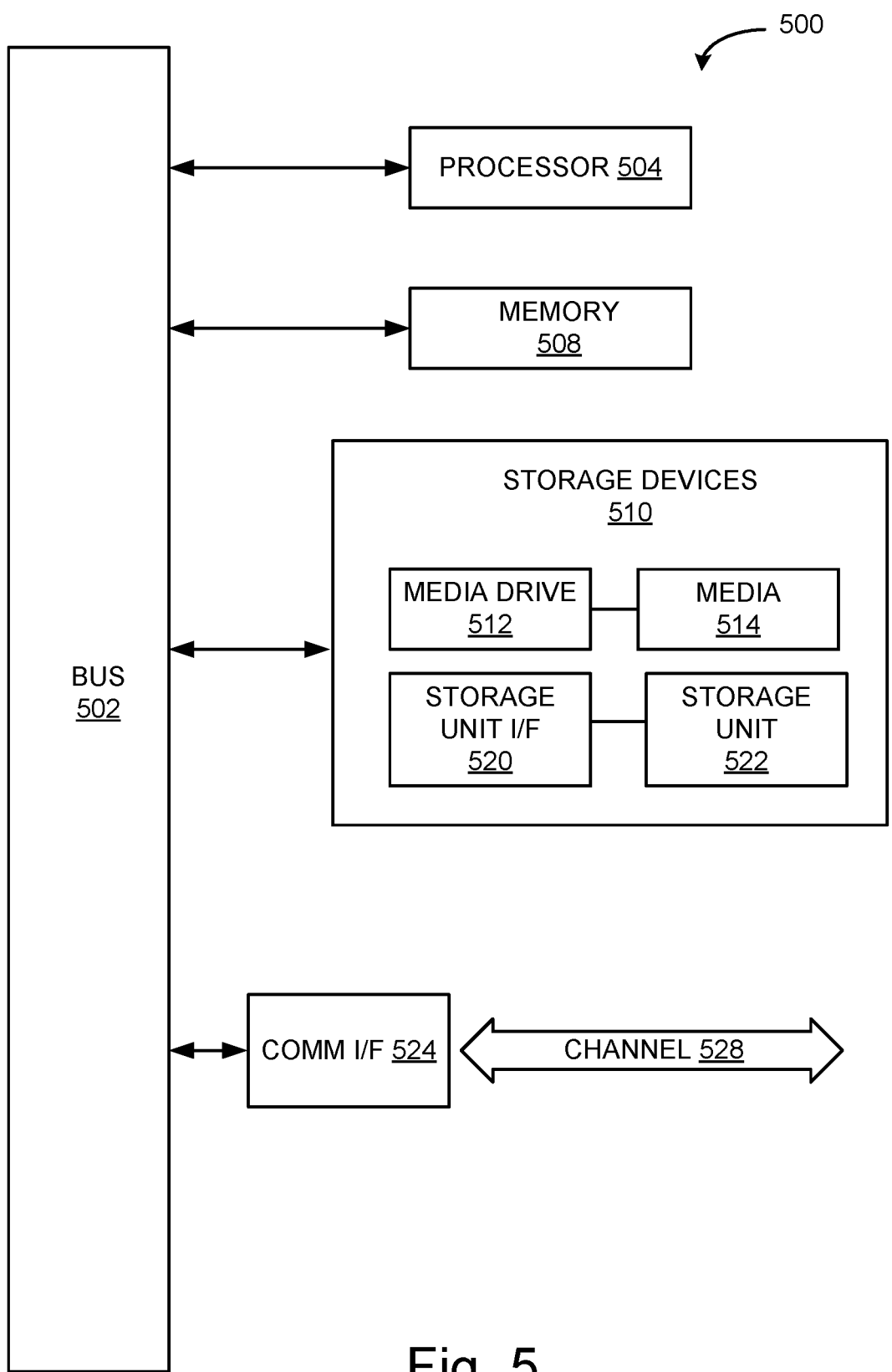
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A window stabilization system for a window of a vehicle, wherein the window of the vehicle is positioned within a window frame of the vehicle when the window is in the closed position, comprising:

a first inflatable bladder positioned within a body portion of the vehicle below an opening in the body portion where the window enters the body portion such that the inflatable bladder will engage a surface of the window when the window is lowered within the body portion;

an inflator in fluid communication with the first inflatable bladder configured to pump a fluid into the inflatable bladder such that when the first inflatable bladder is inflated, the first inflatable bladder comes into physical contact with a surface of the window when the window is lowered within the body portion, wherein the inflator is not actuated until the window, upon opening, reaches a position such that the window is no longer in the window frame of the vehicle; and a bladder control system to control operation of the inflator in response to data received regarding operation of the window.

2. The system of claim 1, further comprising a sensor to detect an amount by which the window is open.

3. The system of claim 1, further comprising a second inflatable bladder positioned opposite the first inflatable bladder adjacent a path along which the window passes such that the second inflatable bladder will engage an opposite surface of the window when the window is opened at least a predetermined amount in the second inflatable bladder is inflated.

4. A window stabilization system for a window of a vehicle, comprising:

a processor; and a memory coupled to the processor to store instructions, which when executed by the processor, cause the processor to perform operations, the operations comprising:

determining whether the window is open such that it is lowered within a body portion of the vehicle below an opening in the body portion where the window enters the body portion;

when the window is open, actuating an inflator to inflate a bladder mechanism comprising a bladder within the body portion such that the bladder comes into physical contact with the window.

5. The system of claim 4, wherein determining whether the window is open comprises determining whether the window is open a predetermined amount.

6. The system of claim 4, wherein the bladder mechanism comprises two bladders adjacent and on opposite sides of the open window such that each bladder comes into physical contact with the window upon inflation.

7. The system of claim 4, wherein the operations further comprise sensing actuation of a window switch operating the window and deflating the bladder mechanism to allow the window to be raised or lowered.

* * * * *